(12) United States Patent
Tsukamoto

(10) Patent No.: US 7,937,729 B2
(45) Date of Patent: May 3, 2011

(54) RECEIVING APPARATUS

(75) Inventor: Nobuyuki Tsukamoto, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 11/677,965

(22) Filed: Feb. 22, 2007

(65) Prior Publication Data
US 2007/0234389 A1 Oct. 4, 2007

(30) Foreign Application Priority Data

Apr. 3, 2006 (JP) .................................. 2006-102179

(51) Int. Cl.
G06F 13/00 (2006.01)
G06F 3/00 (2006.01)
H04N 5/445 (2011.01)

(52) U.S. Cl. ......................................................... 725/58
(58) Field of Classification Search ...................... 725/58
See application file for complete search history.

(56) References Cited

U.S. PATENT DOCUMENTS

| 2002/0049620 | A1* | 4/2002 | Uchida et al. ...................... 705/5 |
| 2002/0174430 | A1* | 11/2002 | Ellis et al. ......................... 725/46 |
| 2003/0023987 | A1* | 1/2003 | Hiramoto et al. ............. 725/141 |
| 2003/0033603 | A1* | 2/2003 | Mori et al. ....................... 725/46 |
| 2003/0106071 | A1* | 6/2003 | Akamatsu et al. ............. 725/139 |
| 2004/0197082 | A1* | 10/2004 | Yim .................................. 386/83 |
| 2005/0028208 | A1* | 2/2005 | Ellis et al. ......................... 725/58 |
| 2005/0198670 | A1* | 9/2005 | Nishimoto ....................... 725/58 |
| 2006/0047678 | A1* | 3/2006 | Miyazaki et al. ............. 707/102 |
| 2006/0059521 | A1* | 3/2006 | Lee et al. .......................... 725/58 |
| 2006/0059522 | A1* | 3/2006 | Huang .............................. 725/58 |
| 2006/0078282 | A1* | 4/2006 | Miyazawa et al. .............. 386/46 |
| 2006/0174280 | A1* | 8/2006 | Choi ................................. 725/58 |
| 2007/0067801 | A1* | 3/2007 | Monta et al. .................... 725/44 |
| 2007/0234389 | A1* | 10/2007 | Tsukamoto ..................... 725/58 |
| 2009/0064233 | A1* | 3/2009 | Kondo et al. .................... 725/58 |

FOREIGN PATENT DOCUMENTS

JP 2003-018483 A 1/2003
WO WO 2005036880 A1 * 4/2005

* cited by examiner

Primary Examiner — Christopher Kelley
Assistant Examiner — Mulugeta Mengesha
(74) Attorney, Agent, or Firm — Canon USA Inc. IP Division

(57) ABSTRACT

A receiving apparatus includes a receiving unit configured to receive a broadcast program, an output unit configured to output video data of the broadcast program received by the receiving unit to a monitor apparatus, a reservation setting unit configured to set reservation of receiving a broadcast program selected from a plurality of broadcast programs, the reservation unit generating reservation information including broadcast start time of a selected broadcast program, a notification unit configured to, based on the broadcast start time included in the reservation information, notify an external apparatus before the broadcast start time that the broadcast start time is approaching, a communication unit configured to receive an operation instruction from the external apparatus, and a control unit configured to control the tuner and the output unit to receive a broadcast program designated by the reservation information and to output video data of the received broadcast program when the communication unit receives an operation instruction for a request for viewing from the external apparatus after the notification indicating that the broadcast start time is approaching.

6 Claims, 8 Drawing Sheets

RECEIVING APPARATUS

BACKGROUND OF THE INVENTION

1. Field of the Invention

The present invention relates to a receiving apparatus.

2. Description of the Related Art

In recent years, along with the start of digital satellite broadcasting and digital terrestrial broadcasting, digital television sets (DTVs) which are configured to receive digital broadcasting have been developed. In digital broadcasting, Electronic Program Guide (EPG) information as well as ordinary broadcast program information is multiplexed and transmitted to local stations. Users can easily reserve receiving and viewing of a broadcast program with the DTV using the EPG information.

Conventionally, there is known a method in which a notice is given to a user before broadcasting of a program reserved for viewing (for example, Japanese Patent Application Laid-Open No. 2003-18483, which corresponds to U.S. Patent Application Publication No. 2003/0033603 A1).

However, according to the configuration discussed in Japanese Patent Application Laid-Open No. 2003-18483, if the user is not in the vicinity of a DTV when being given a notice, the user may not be able to view the viewing-reserved program. Further, even if the user is in the vicinity of the DTV when being given a notice, the user may fail to immediately output and display the viewing-reserved program on the DTV.

SUMMARY OF THE INVENTION

Exemplary embodiments of the present invention are directed to facilitating viewing of a viewing-reserved broadcast program.

According to an aspect of the present invention, a receiving apparatus includes a receiving unit configured to receive a broadcast program an output unit configured to output video data of the broadcast program received by the receiving unit to a monitor apparatus, a reservation setting unit configured to set reservation of receiving a broadcast program selected from a plurality of broadcast programs, the reservation setting unit generating reservation information including broadcast start time of a selected broadcast program, a notification unit configured to, based on the broadcast start time included in the reservation information, notify an external apparatus before the broadcast start time that the broadcast start time is approaching, a communication unit configured to receive an operation instruction from the external apparatus, and a control unit configured to control the receiving unit and the output unit to receive a broadcast program designated by the reservation information and to output video data of the received broadcast program when the communication unit receives an operation instruction for a request for viewing from the external apparatus after the notification unit notifies the external operation apparatus that the broadcast start time is approaching.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
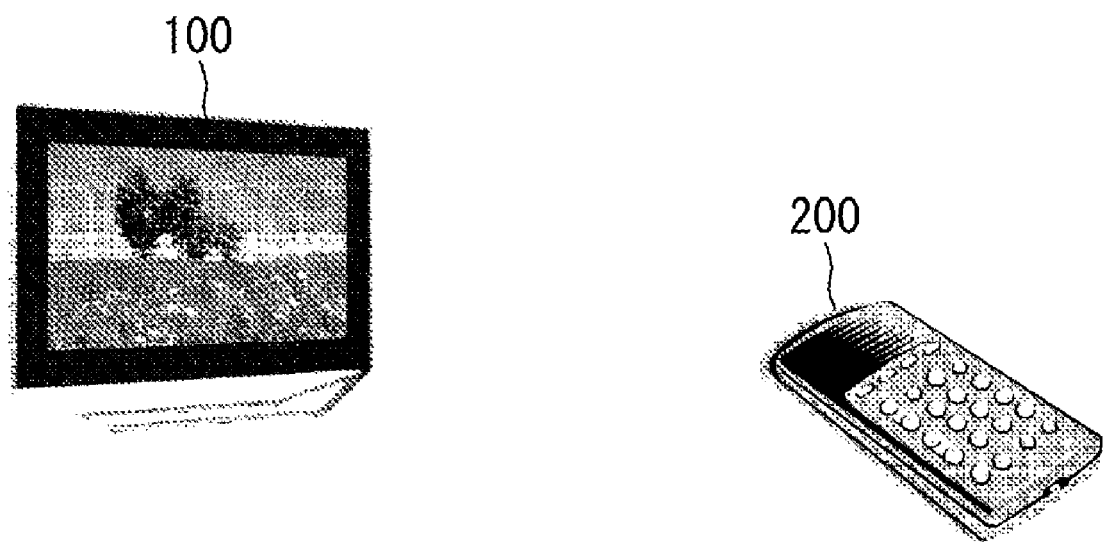
FIG. 1 illustrates an external view of a DTV and a remote control unit according to a first exemplary embodiment of the present invention.

FIG. 1 illustrates a configuration of a DTV system according to a first exemplary embodiment of the present invention.

The DTV system according to the first exemplary embodiment includes a DTV 100 and a remote control unit 200. The remote control unit 200 is configured to allow a user to operate the DTV 100.

Figure 2:
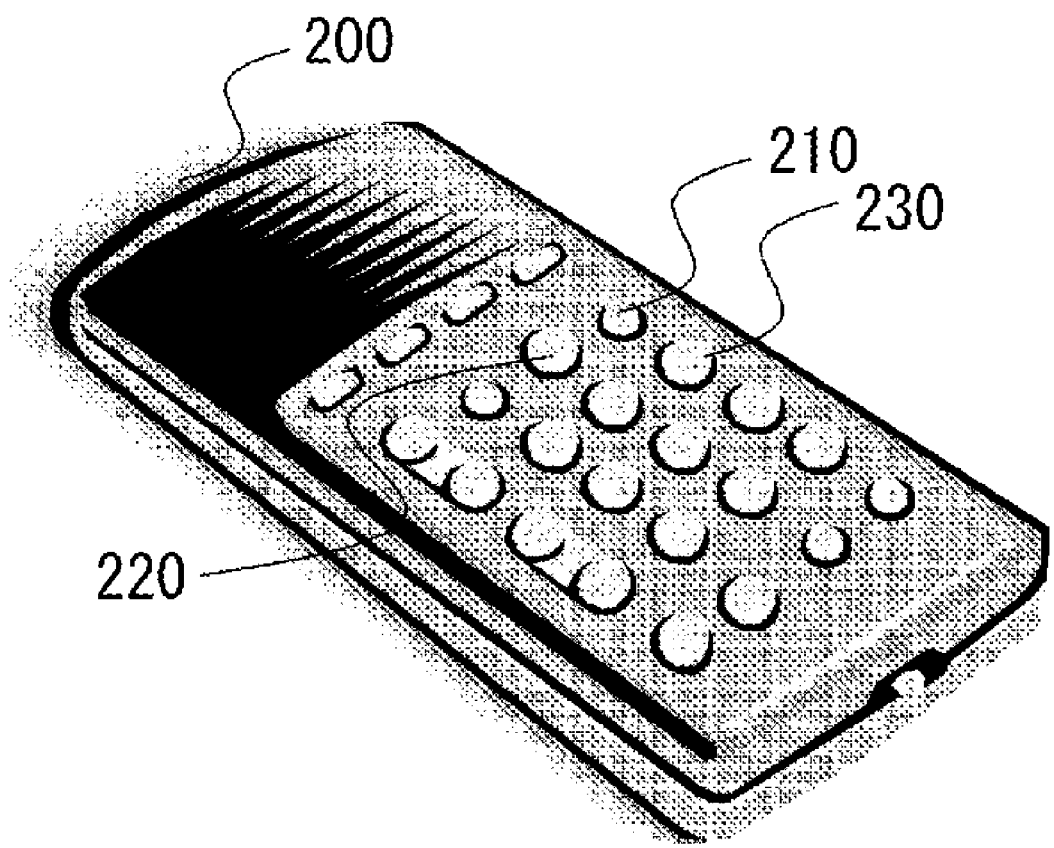
FIG. 2 illustrates a detailed external view of the remote control unit.

FIG. 2 illustrates an example of a detailed appearance of the remote control unit 200. A power button 210 is used to power on/off the DTV 100. A view button 220 is used to notify the DTV 100 of a request for viewing. A record button 230 is used to notify the DTV 100 of a request for recording. In addition to these buttons, the remote control unit 200 can have a variety of buttons for the DTV 100, such as a viewing reservation button, a channel button, and a volume control button.

Figure 3:
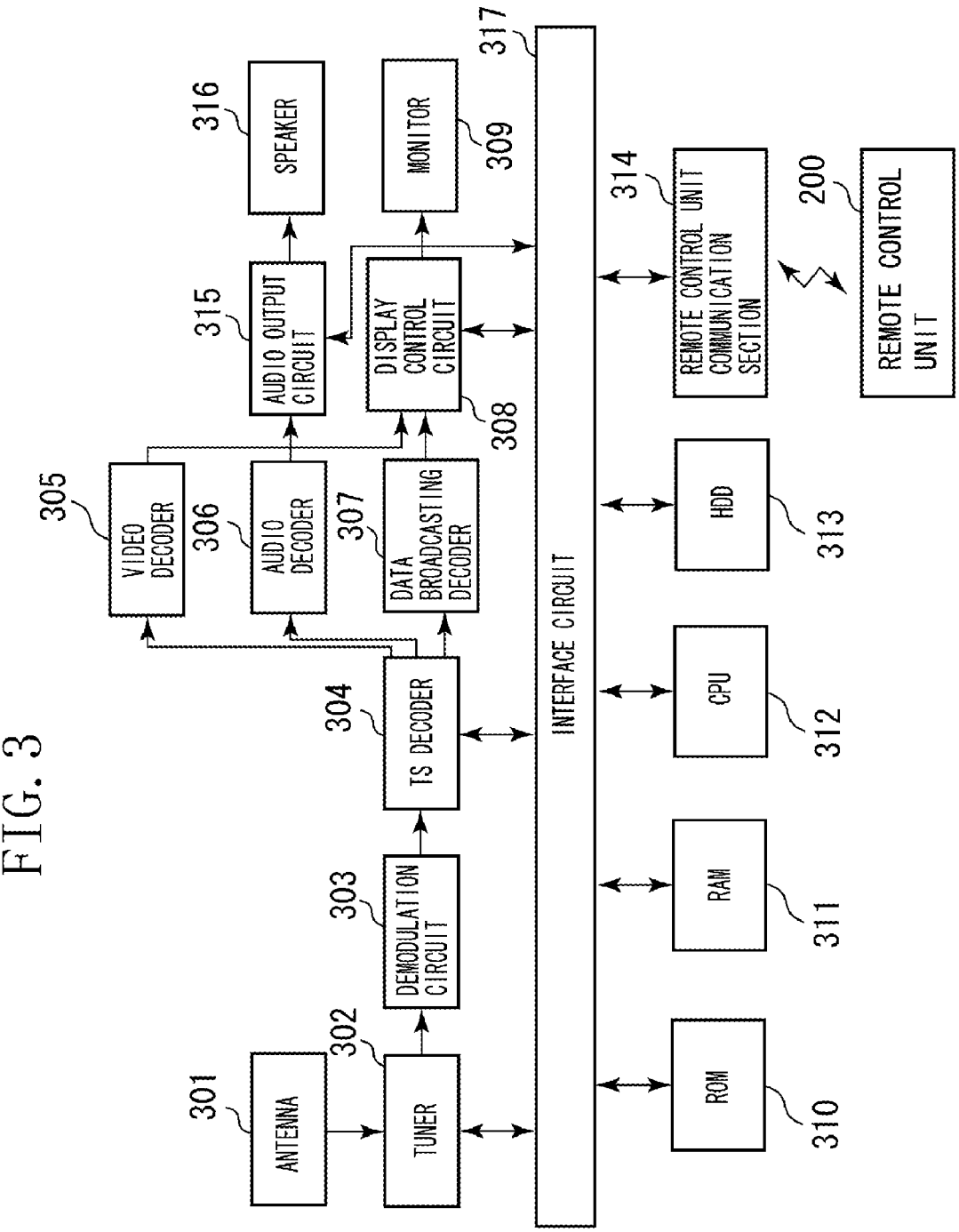
FIG. 3 is a block diagram illustrating a configuration of the DTV according to the first exemplary embodiment.

FIG. 3 is a block diagram illustrating a configuration of the DTV 100. An antenna 301 is configured to receive a digital broadcast wave. A tuner 302 is configured to select and tune the digital broadcast wave received by the antenna 301. A demodulation circuit 303 decodes the selected digital broadcast wave and converts it into signals in an MPEG2 transport stream (MPEG2-TS) format. A transport stream (TS) decoder 304 separates video data, audio data, and data-broadcasting data from the MPEG2-TS output from the demodulation circuit 303.

A video decoder 305 decodes the video data separated from the MPEG2-TS. An audio decoder 306 decodes the audio data separated from the MPEG2-TS. A data broadcasting decoder 307 decodes the data-broadcasting data separated from the MPEG2-TS. A display control circuit 308 synthesizes various types of video data including data of a broadcast program, data-broadcasting data, menu data, and EPG data, and outputs the synthesized video data to a monitor 309. The monitor 309 serves as a display screen of the DTV 100.

A read-only memory (ROM) 310 stores a program for controlling the DTV 100 as well as an application program and various types of data for the DTV 100. A random access memory (RAM) 311 stores a program for controlling the DTV 100 as well as an application program and various types of data for the DTV 100. The RAM 311 also functions as a working memory for the operation of the application program or other programs. A central processing unit (CPU) 312 controls the DTV 100 to execute various types of applications.

A hard disk (HDD) 313 can record TS data received by the antenna 301 and the tuner 302. A remote control unit communication section 314 receives various commands from the remote control unit 200 with an exemplary infrared communication method and sends the commands to the CPU 312. Further, the remote control unit communication section 314 transmits control information to the remote control unit 200. An audio output circuit 315 amplifies the audio data decoded by the audio decoder 306, selects an output channel, and outputs the amplified audio data to a speaker 316. An interface circuit 317 transmits data between various circuit blocks.

Ordinary receiving and recording operations of the DTV 100 will now be described with reference to FIG. 3.

By operating the remote control unit 200, a user can power on/off the DTV 100, change channels, display an EPG, record a broadcast program, reserve viewing of a broadcast program, etc.

In order to view a TV program, the user operates the remote control unit 200 to power on the DTV 100 and to select a channel of a broadcast program to be viewed. When receiving an instruction from the remote control unit 200, the CPU 312 controls the tuner 302 to receive a broadcast wave of a selected channel, and sends the selected broadcast wave to the demodulation circuit 303. The demodulation circuit 303 converts the selected broadcast wave into signals in a transport stream in which video data, audio data, and data-broadcasting data are multiplexed. Then, the demodulation circuit 303 sends the transport stream to the TS decoder 304.

In the current digital terrestrial broadcasting and digital satellite broadcasting, video data, audio data and data-broadcasting data are configured in MPEG2-TS format. The TS decoder 304 separates video data, audio data, and data-broadcasting data from the received MPEG2-TS. Then, the TS decoder 304 sends the video data to the video decoder 305, the audio data to the audio decoder 306, and the data-broadcasting data to the data broadcasting decoder 307.

Further, the TS decoder 304 extracts EPG data included in the MPEG2-TS and stores the EPG data in the RAM 311 via the interface circuit 317.

The video decoder 305 decodes the video data and outputs the decoded video data to the display control circuit 308. The data broadcasting decoder 307 decodes the data-broadcasting data and outputs the decoded data-broadcasting data to the display control circuit 308. The audio decoder 306 decodes the audio data and outputs the decoded audio data to the audio output circuit 315.

The display control circuit 308 selects the video data output from the video decoder 305 when the CPU 312 is instructed by the remote control unit 200 to display a broadcast program. Then, the display control circuit 308 outputs the selected video data to the monitor 309 so as to display the broadcast program. When the CPU 312 is instructed by the remote control unit 200 to display data broadcasting, the CPU 312 controls the display control circuit 308 to select data-broadcasting data decoded by the data broadcasting decoder 307. Then, the display control circuit 308 outputs the selected data-broadcasting data to the monitor 309 to display the data broadcasting.

Furthermore, when receiving an instruction to record a broadcast program from the remote control unit 200 when the user is viewing a broadcast program, the CPU 312 sends stream data that is being output from the TS decoder 304 to the HDD 313. The HDD 313 then records the stream data.

When the user intends to play back broadcast program data recorded on the HDD 313, the user operates a playback button on the remote control unit 200. When the CPU 312 receives a request for playback, the CPU 312 instructs the monitor 309 to display broadcast program titles and thumbnail images recorded on the HDD 313. The user then operates the remote control unit 200 to select a broadcast program to be played back from the displayed broadcast program titles and thumbnail images and to send an instruction for starting a playback of the broadcast program. When the CPU 312 receives the instruction, the CPU 312 reads out data of the selected broadcast program sequentially from the HDD 313 and sends the read data to the TS decoder 304.

The TS decoder 304 separates video data, audio data, and data-broadcasting data from the MPEG2-TS read out from the HDD 313 and sends the video data, audio data, and data-broadcasting data to the video decoder 305, the audio decoder 306, and the data broadcast decoder 307, respectively.

The video decoder 305 decodes the video data and sends the decoded video data to the display control circuit 308. The data broadcast decoder 307 decodes the data-broadcasting data and sends the decoded data-broadcasting data to the display control circuit 308. The audio decoder 306 decodes the audio data and sends the decoded audio data to the audio output circuit 315.

Then, the display control circuit 308 causes the monitor 309 to display the video data sent from the HDD 313 instead of the broadcast program received from the tuner 301. Further, the speaker 316 outputs audio sound played back from the HDD 313.

When the CPU 312 is instructed by the remote control unit 200 to display various menu options, the CPU 312 controls the display control circuit 308 to generate menu screen data and to display a menu screen on the monitor 309.

A viewing reservation processing and a recording reservation processing will now be described.

In the present embodiment, a reservation processing uses the EPG. The EPG is multiplexed in a stream of a broadcast program. As described above, the RAM 311 stores the latest EPG data.

When the user operates the remote control unit 200 to send an instruction to display a program guide, the CPU 312 reads out the EPG data stored in the RAM 311, generates program guide data based on the EPG data, and sends the program guide data to the display control circuit 308. Then, the CPU 312 controls the display control circuit 308 to display the program guide on the monitor 309.

By operating the remote control unit 200, the user can perform a recording reservation or a viewing reservation using the program guide.

When receiving an instruction for a recording reservation or a viewing reservation, the CPU 312 acquires information, such as broadcast date and time, channel, and title, of a broadcast program to be recorded or viewed from the EPG data and stores such information in the RAM 311 together with either recording reservation information or viewing reservation information. It is to be noted that the CPU 312 can store the recording reservation information or the viewing reservation information on the HDD 313. In the following description, such information is stored in the RAM 311.

The CPU 312 has an internal timer. Based on a time indicated by the internal timer and the recording reservation information stored in the RAM 311, the CPU 312 automatically powers on the DTV 100 to receive a broadcast program of a specified channel and to record the broadcast program on the HDD 313 when a recording reservation time of the recording-reserved program occurs. Also, based on a time indicated by the internal timer and the viewing reservation information stored in the RAM 311, the CPU 312 automatically powers on the DTV 100 to receive a broadcast program of a specified channel and to display the broadcast program on the monitor 309 when a viewing reservation time of the viewing-reserved broadcast program occurs.

A process for a viewing reservation will now be described.

Figure 4:
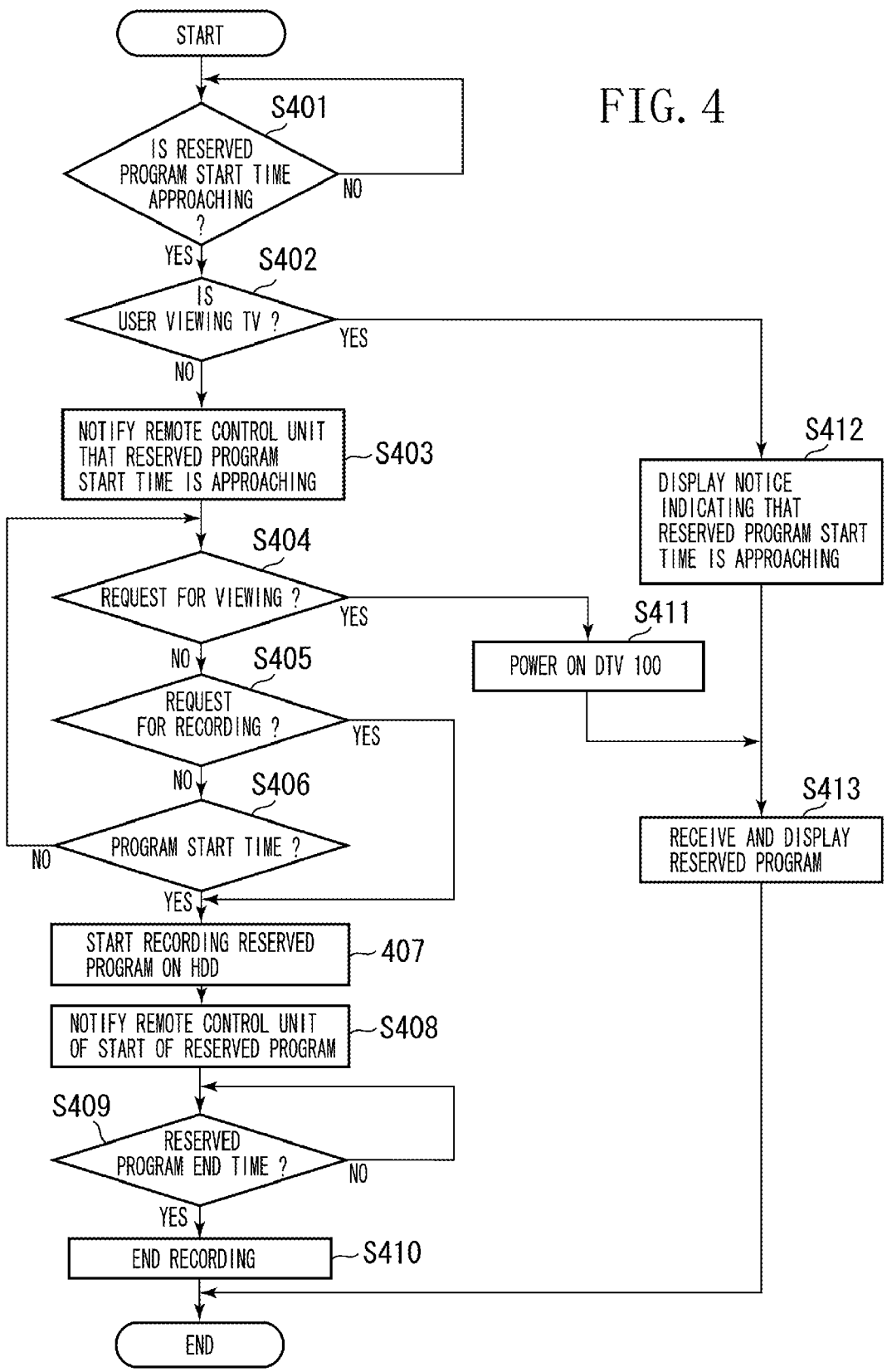
FIG. 4 is a flowchart illustrating an operation process performed by the DTV after the setting of a viewing reservation according to the first exemplary embodiment.

FIG. 4 is a flowchart illustrating an operation process performed by the DTV 100 after the setting of a viewing reservation according to the first exemplary embodiment. Here, the user has reserved viewing of a broadcast program A starting at 9:00 p.m. on the DTV 100 using the remote control unit 200. The viewing reservation information is stored in the RAM 311.

In step S401, the CPU 312 determines whether the current time is a predetermined period of time before the start time of the broadcast program A (9 p.m.) based on a time indicated by the internal timer and the viewing reservation information. If the CPU 312 determines that the current time is a predetermined period of time before the broadcast program start time (for example, one minute before the start time of the broadcast program A, i.e., 8:59 p.m.) (YES in step S401), the process proceeds to step S402. It is to be noted that one minute is exemplary and may also be, for example, two minutes. Information regarding a predetermined period of time before the start time of a broadcast program can be provided in a program, etc., or, for example, the user can store the information on the HDD 313 or in the RAM 311 of the DTV 100 by operating the remote control unit 200. On the other hand, if the CPU 312 determines that the current time is not a predetermined period of time before the start time of the broadcast program (NO in step S401), the process repeats step S401.

In step S402, the CPU 312 determines whether the user is viewing a TV broadcast program on the DTV 100. If the user is viewing a TV broadcast program (YES in step S402), the process proceeds to step S412. In step S412, the CPU 312 instructs the display control circuit 308 to display a notice on the monitor 309 indicating that the broadcast start time of the viewing-reserved program is approaching.

In step S413, when the broadcast start time of the viewing-reserved program A comes, the CPU 312 controls each component of the DTV 100 to switch the receiving channel to the broadcast channel of the reserved broadcast program A and to receive and output video and sound of the reserved broadcast program A.

In step S402, if the user is not viewing a TV broadcast program (NO in step S402), the process proceeds to step S403. In step S403, the CPU 312 controls the remote control unit communication section 314 to notify the remote control unit 200 that the broadcast start time of the viewing-reserved program is approaching. The remote control unit 200 is equipped with a light-emitting section, a sound-output section, and a vibration mechanism (not shown). When being notified that the broadcast start time of the viewing-reserved program is approaching, the remote control unit 200 emits light, outputs sound, or vibrates to notify the user that the broadcast start time of the viewing-reserved program is approaching.

The user can send a request for viewing to the DTV 100 by pressing the power button 210 or the view button 220 of the remote control unit 200 while the remote control unit 200 is emitting light, outputting sound, or vibrating.

In step S404, the CPU 312 determines whether the DTV 100 has received a request for viewing from the remote control unit 200. If the CPU 312 determines that the DTV 100 has received a request for viewing (YES in step S404), the process proceeds to step S411. If the CPU 312 determines that the DTV 100 has not received a request for viewing (NO in step S404), the process proceeds to step S405.

In step S411, the CPU 312 powers on the DTV 100. In step S413, when the broadcast start time of the viewing-reserved program A comes, the CPU 312 controls each component of the DTV 100 to switch the receiving channel to the broadcast channel of the reserved broadcast program A and to receive and output video and sound of the reserved broadcast program A.

The user can send a request for recording to the DTV 100 by pressing the record button 230 of the remote control unit 200 while the remote control unit 200 is emitting light, outputting sound, or vibrating.

In step S405, the CPU 312 determines whether the DTV 100 has received a request for recording from the remote control unit 200. If the CPU 312 determines that the DTV 100 has received a request for recording (YES in step S405), the process proceeds to step S407. If the CPU 312 determines that the DTV 100 has not received a request for recording (NO in step S405), the process proceeds to step S406.

In step S406, based on a time indicated by the internal timer and the viewing reservation information, the CPU 312 determines whether the current time is a broadcast start time of the viewing-reserved program A.

If the CPU 312 determines that the current time is the broadcast start time of the viewing-reserved program A (YES in step S406), the process proceeds to step S407. If the CPU 312 determines that the current time is still not the broadcast start time of the viewing-reserved program A (NO in step S406), the process returns to step S404.

In step S407, the CPU 312 powers on the DTV 100. Then, the CPU 312 starts processing for switching the receiving channel to the broadcast channel of the viewing-reserved broadcast program A and receiving and recording video data and audio data (TS data) of the reserved broadcast program A on the HDD 313. In this case, the CPU 312 inhibits the monitor 309 from displaying a video image and the speaker 316 from outputting an audio sound.

In step S408, the CPU 312 notifies the remote control unit 200 that the broadcast start time of the viewing-reserved program A has come. When being notified, the remote control unit 200 stops emitting light, outputting sound, or vibrating.

In step S409, the CPU 312 determines whether the current time is a broadcast end time of the viewing-reserved program A. The CPU 312 continues to record the viewing-reserved program A on the HDD 313 until the broadcast end time occurs. In step S410, the CPU 312 ends recording of the viewing-reserved program A.

As described above, according to the present embodiment, when a broadcast start time of a viewing-reserved program is approaching, a remote control unit is notified. According to a notification that the broadcast start time of the viewing-reserved program is approaching, the remote control unit emits light, outputs sound, or vibrates.

Accordingly, by checking a state of the remote control unit, a user can easily know that the broadcast start time of the viewing-reserved program is approaching even when a DTV is not powered on.

Additionally, the user can view the viewing-reserved program by simply operating a viewing request button of the remote control unit during a period from the notification indicating that the broadcast start time of the viewing-reserved program is approaching to the broadcast start time.

Moreover, the user can record the viewing-reserved program by simply operating a recording request button of the remote control unit during a period from the notification indicating that the broadcast start time of the viewing-reserved program is approaching to the broadcast start time.

Furthermore, according to the present embodiment, the DTV records the viewing-reserved program even if the user does not generate a request for viewing or a request for recording during a period from the notification indicating that the broadcast start time of the viewing-reserved program is approaching to the broadcast start time.

Thus, for example, when the user is not in the vicinity of the DTV at the broadcast start time of the viewing-reserved program and, therefore, cannot operate the viewing request button of the remote control unit, unnecessary displaying of a video image on the monitor can be avoided.

Even in such a case, since the DTV automatically records the viewing-reserved program, the user can play back and view the viewing-reserved program at a later time.

Second Exemplary Embodiment

Figure 5:
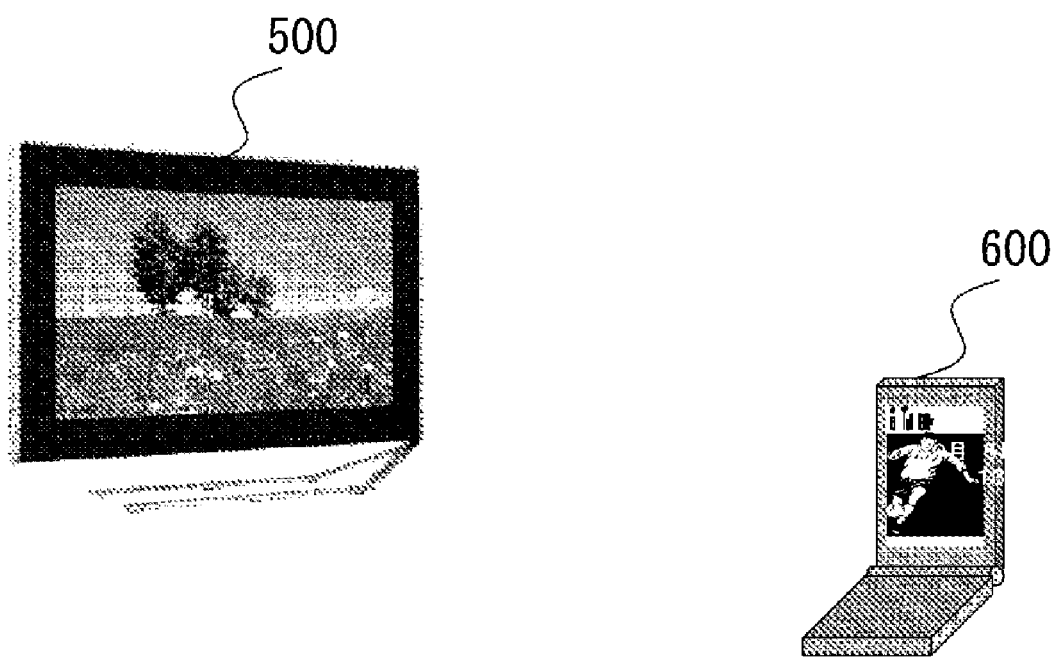
FIG. 5 illustrates an external view of a DTV and a mobile phone according to a second exemplary embodiment of the present invention.

FIG. 5 illustrates a configuration of a DTV system according to a second exemplary embodiment of the present invention.

The DTV system according to the second exemplary embodiment includes a DTV 500 and a mobile phone 600. The mobile phone 600 is capable of communicating with the DTV 500. In addition to a general telephone function and an electronic mail function, the mobile phone 600 has a function to operate the DTV 500.

Figure 6:
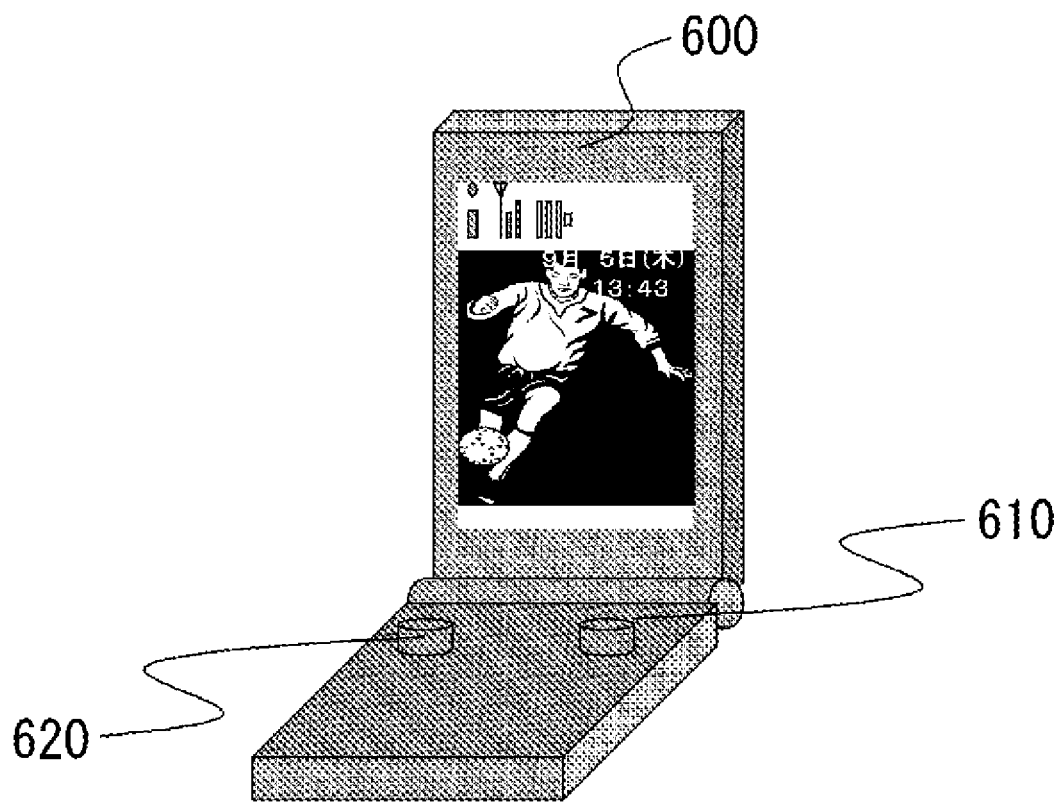
FIG. 6 illustrates a detailed external view of the mobile phone.

FIG. 6 illustrates an example of a detailed appearance of the mobile phone 600.

A view button 610 is used to send a request for viewing to the DTV 500. A record button 620 is used to send a request for recording to the DTV 500. In addition to the buttons shown in FIG. 6, the mobile phone 600 has a variety of operation keys for changing channels, controlling volume, displaying a program guide, and setting reservation. Functions of the operation keys are changed according to a state of the mobile phone 600 such as a telephone state, an electronic mail state, a DTV operation state.

Figure 7:
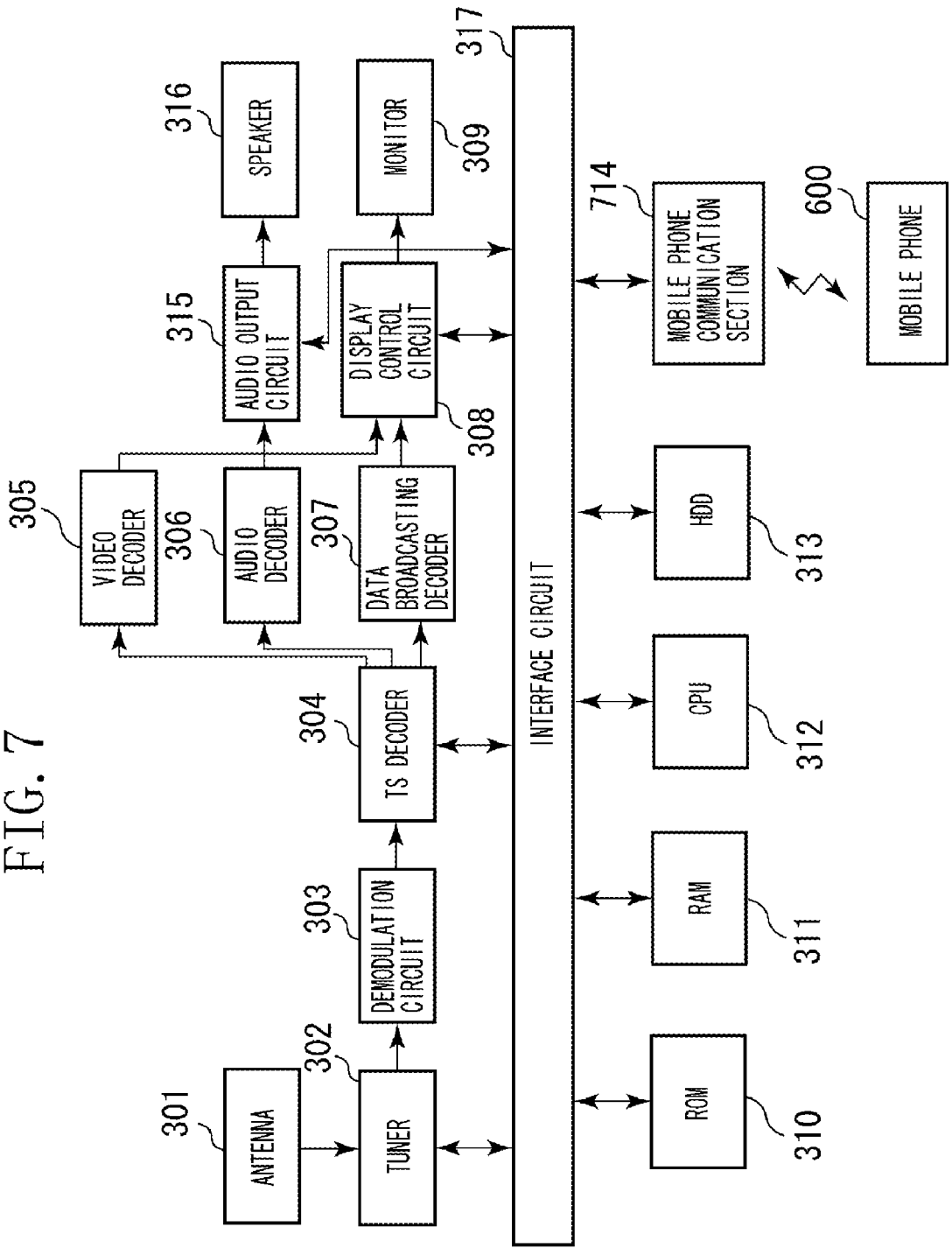
FIG. 7 is a block diagram illustrating a configuration of the DTV according to the second exemplary embodiment.

FIG. 7 is a block diagram showing a configuration of the DTV 500 according to the present embodiment.

It is to be noted that most configurations and functions of the DTV 500 illustrated in FIG. 7 are similar to those of the DTV 100 illustrated in FIG. 3. The DTV 500 in FIG. 7 includes a mobile phone communication section 714 in place of the remote control unit communication section 314. The mobile phone communication section 714 can send and receive information to and from the mobile phone 600 using an infrared communication method or a wireless communication method. Also, a CPU 312 controls each component of the DTV 500 according to various commands received via the mobile phone communication section 714.

Since basic operations of the DTV 500 such as a receiving operation and a recording operation are similar to those in the first exemplary embodiment, a detailed description thereof will not be repeated.

The user can operate the mobile phone 600 to generate instructions for turning on/off the DTV 500, changing channels, displaying an EPG, recording a broadcast program, reserving viewing of a broadcast program, etc.

A view reservation processing and a record reservation processing will now be described.

In the present embodiment, a reservation processing is performed using the EPG. In a RAM 311, the latest EPG data is stored.

When the user operates the mobile phone 600 to send an instruction to display a program guide, the CPU 312 reads out the EPG data stored in the RAM 311, generates program guide data based on the EPG data, and sends the program guide data to a display control circuit 308. Then, the CPU 312 controls the display control circuit 308 to display the program guide on a monitor 309.

By operating the mobile phone 600, the user can perform a recording reservation or a viewing reservation using the program guide.

When receiving an instruction for a recording reservation or a viewing reservation, the CPU 312 acquires information, such as broadcast date and time, channel, and title, of a broadcast program to be recorded or viewed from the EPG data and stores such information in the RAM 311 together with either recording reservation information or viewing reservation information. It is to be noted that the CPU 312 can store the recording reservation information and the viewing reservation information on the HDD 313.

Based on a time indicated by an internal timer and the recording reservation information, the CPU 312 automatically powers on the DTV 500 to receive a broadcast program of a specified channel and to record the broadcast program on the HDD 313 when a recording reservation time of the recording-reserved program occurs. Also, based on a time indicated by the internal timer and the viewing reservation information, the CPU 312 automatically powers on the DTV 500 to receive a broadcast program of a specified channel and to display the broadcast program on the monitor 309 when a viewing reservation time of the viewing-reserved broadcast program occurs.

A process for a view reservation will now be described.

Figure 8:
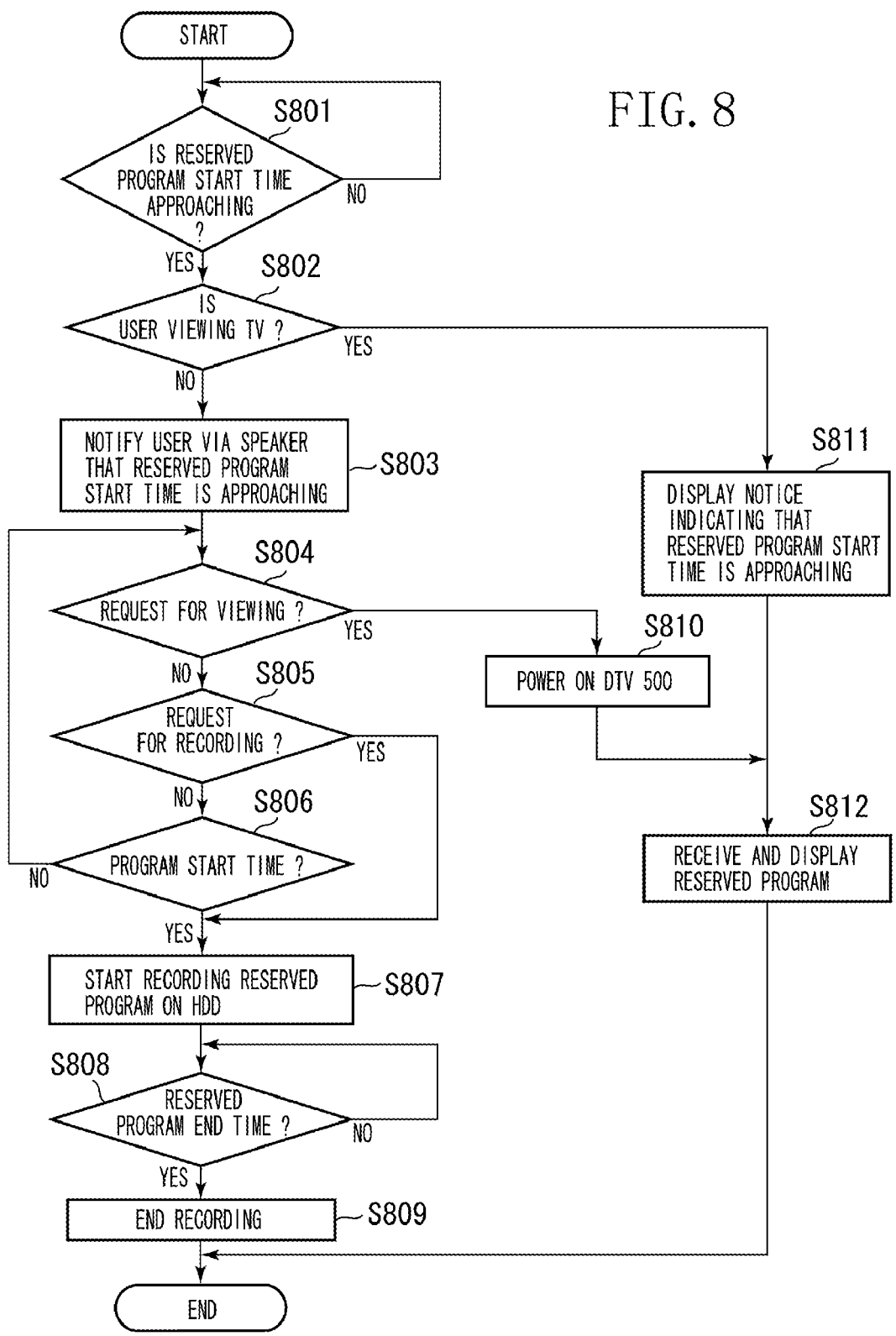
FIG. 8 is a flowchart illustrating an operation process performed by the DTV after the setting of a viewing reservation according to the second exemplary embodiment.

FIG. 8 is a flowchart illustrating an operation process performed by the DTV 500 after the setting of a viewing reservation according to the present embodiment.

Here, the user has reserved viewing of a broadcast program B starting at 10:00 p.m. on the DTV 500 using the mobile phone 600. The viewing reservation information is stored in the RAM 311.

In step S801, the CPU 312 determines whether the current time is a predetermined period of time before the start time of the broadcast program B (10 p.m.) based on a time indicated by the internal timer and the viewing reservation information. If the CPU 312 determines that the current time is a predetermined period of time before the broadcast program start time (for example, one minute before the start time of the broadcast program B, i.e., 9:59 p.m.) (YES in step S801), the process proceeds to step S802. It is to be noted that one minute is exemplary and may also be, for example, two minutes.

On the other hand, if the CPU 312 determines that the current time is not a predetermined period of time before the start time of the broadcast program (NO in step S801), the process repeats step S801.

In step S802, the CPU 312 determines whether the user is viewing a TV broadcast program on the DTV 500. If the user is viewing a TV broadcast program (YES in step S802), the process proceeds to step S811. In step S811, the CPU 312 instructs the display control circuit 308 to display a notice on the monitor 309 indicating that the broadcast start time of the viewing-reserved program is approaching.

In step S812, when the broadcast start time of the viewing-reserved program B comes, the CPU 312 controls each component of the DTV 500 to switch the receiving channel to the broadcast channel of the reserved broadcast program B and to receive and output video and sound of the reserved broadcast program B.

In step S802, if the user is not viewing a TV broadcast program (NO in step S802), the process proceeds to step S803. In step S803, the CPU 312 causes the speaker 316 to output sound so as to notify the user that the broadcast start time of the viewing-reserved program is approaching.

As in the first exemplary embodiment, the CPU 312 may control the mobile phone communication section 714 to notify the mobile phone 600 that the broadcast start time of the viewing-reserved program is approaching. In this case, the mobile phone 600 may output sound, emit light, or vibrate to notify the user that the broadcast start time of the viewing-reserved program is approaching. After a given period of time, the mobile phone 600 stops outputting sound, emitting light, or vibrating.

Furthermore, when the user performs a viewing reservation, information such as a start time and a channel of the viewing-reserved program B may also be stored in a memory included in the mobile phone 600. In this case, based on the broadcast start time of the viewing-reserved program B and a time indicated by the internal timer, the mobile phone 600 may output sound, emit light, or vibrate if the current time is a predetermined period of time before the broadcast start time so as to notify the user that the broadcast start time of the viewing-reserved program B is approaching.

The user can send a request for viewing to the DTV 100 by pressing the view button 610 while being notified via the speaker 316 that the broadcast start time of the viewing-reserved program B is approaching.

In step S804, the CPU 312 determines whether the DTV 500 has received a request for viewing from the mobile phone 600. If the CPU 312 determines that the DTV 500 has received a request for viewing (YES in step S804), the process proceeds to step S810. If the CPU 312 determines that the DTV 500 has not received a request for viewing (NO in step S804), the process proceeds to step S805.

In step S810, the CPU 312 powers on the DTV 500. In step S812, when the broadcast start time of the viewing-reserved program B occurs, the CPU 312 controls each component of the DTV 500 to switch the receiving channel to the broadcast channel of the reserved broadcast program B and to receive and output video and sound of the reserved broadcast program B.

The user can send a request for recording to the DTV 500 by pressing the record button 620 of the mobile phone 600 while being notified via the speaker 316 that the broadcast start time of the viewing-reserved program B is approaching.

In step S805, the CPU 312 determines whether the DTV 500 has received a request for recording from the mobile phone 600. If the CPU 312 determines that the DTV 500 has received a request for recording (YES in step S805), the process proceeds to step S807. If the CPU 312 determines that the DTV 500 has not received a request for recording (NO in step S805), the process proceeds to step S806.

In step S806, based on a time indicated by the internal timer and the viewing reservation information, the CPU 312 determines whether the current time is a broadcast start time of the viewing-reserved program B.

If the CPU 312 determines that the current time is the broadcast start time of the viewing-reserved program B (YES in step S806), the process proceeds to step S807. If the CPU 312 determines that the current time is still not the broadcast start time of the viewing-reserved program B (NO in step S806), the process returns to step S804.

In step S807, the CPU 312 powers on the DTV 500. Then, the CPU 312 starts processing for switching the receiving channel to the broadcast channel of the viewing-reserved broadcast program B and receiving and recording video data and audio data (TS data) of the reserved broadcast program B on the HDD 313. In this case, the CPU 312 inhibits the monitor 309 from displaying a video image and the speaker 316 from outputting an audio sound.

In step S808, the CPU 312 determines whether the current time is a broadcast end time of the viewing-reserved program B. The CPU 312 continues to record the viewing-reserved program B until the broadcast end time comes. In step S809, the CPU 312 ends recording of the viewing-reserved program B.

As described above, according to the present embodiment, when a broadcast start time of a viewing-reserved program is approaching, a speaker accordingly notifies the user that the broadcast start time of the viewing-reserved program is approaching.

Accordingly, a user can easily know that the broadcast start time of the viewing-reserved program is approaching even when a DTV is not powered on.

Additionally, the user can view the viewing-reserved program by simply operating a viewing request button of the mobile phone during a period from the notification indicating that the broadcast start time of the viewing-reserved program is approaching to the broadcast start time.

Moreover, the user can record the viewing-reserved program by simply operating a recording request button of the mobile phone during a period from the notification indicating that the broadcast start time of the viewing-reserved program is approaching to the broadcast start time.

Furthermore, according to the present embodiment, the DTV records the viewing-reserved program even if the user does not generate a request for viewing or a request for recording during a period from the notification indicating that the broadcast start time of the viewing-reserved program is approaching to the broadcast start time.

Thus, for example, when the user is not in the vicinity of the DTV at the broadcast start time of the viewing-reserved program and, therefore, cannot operate the viewing request button of the mobile phone, unnecessary displaying of a video image on the monitor can be avoided.

Even in such a case, since the DTV automatically records the viewing-reserved program, the user can play back and view the viewing-reserved program at a later time.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-102179 filed Apr. 3, 2006, which is hereby incorporated by reference herein in its entirety.

What is claimed is:
1. A receiving apparatus comprising:
a receiving unit configured to receive a broadcast program;
an output unit configured to output video data of the broadcast program received by the receiving unit to a monitor apparatus;
a reservation setting unit configured to set reservation of receiving a broadcast program selected from a plurality of broadcast programs, the reservation setting unit generating reservation information including broadcast start time of a selected broadcast program;

a detection unit configured to detect that the broadcast start time of the reserved broadcast program is approaching based on the broadcast start time included in the reservation information;

a communication unit configured to communicate with a remote control unit for allowing a user to operate the receiving apparatus by a wireless communication; and a control unit configured to discriminate whether the receiving apparatus is power-on state in response to the detection unit detecting that the broadcast start time of the reserved broadcast program is approaching and to determine whether a notification that the broadcast start time of the reserved broadcast program is approaching performed by using the monitor apparatus or the remote control unit is notified that the broadcast start time is approaching in accordance with a result of the discrimination, wherein the control unit notifies by using the monitor apparatus if it is discriminated that the receiving apparatus is power-on state, and controls the communication unit to send an information indicating that the broadcast start time is approaching to the remote control unit such that the remote control unit notifies the user that the broadcast time is approaching if it is discriminated that the receiving apparatus is not power-on state, and wherein the control unit, if it is discriminated that the receiving apparatus is not power-on state, powers on the receiving unit and controls the receiving unit and the output unit to receive a broadcast program designated by the reservation information and to output video data of the received broadcast program in response to the communication unit receiving a request for viewing of the reserved broadcast program from the remote control unit after the information indicating that the broadcast start time is approaching is send to the remote control unit by the communication unit.

2. The receiving apparatus according to claim 1, further comprising a recording unit configured to record video data of the broadcast program received by the receiving unit on a recording medium, wherein the control unit controls the receiving unit and the recording unit to automatically receive the broadcast program designated by the reservation information and to automatically record video data of the broadcast program designated by the reservation information if the communication unit does not receive the request for viewing of the reserved broadcast program from the remote control unit during a period from the sending of the information indicating that the broadcast start time of the broadcast program designated by the reservation information is approaching to the broadcast start time.

3. The receiving apparatus according to claim 1, wherein the notification unit is configured to, based on the broadcast start time included in the reservation information, continue to notify that the broadcast start time is approaching during a period from a predetermined period of time before the broadcast start time to the broadcast start time.

4. A receiving apparatus comprising:
a receiving unit configured to receive a broadcast program;
a recording unit configured to record video data of the broadcast program received by the receiving unit on a recording medium;
an output unit configured to output video data of the broadcast program received by the receiving unit to a monitor apparatus;
a reservation setting unit configured to set a reservation of receiving a broadcast program selected from a plurality of broadcast programs, the reservation setting unit generating reservation information including broadcast start time of a selected broadcast program;
a detection unit configured to detect that the broadcast start time of the reserved broadcast program is approaching based on the broadcast start time included in the reservation information;
a communication unit configured to communicate with a remote control unit for allowing a user to operate the receiving apparatus by a wireless communication; and a control unit configured to control the communication unit to send an information indicating that the broadcast start time is approaching to the remote control unit such that the remote control unit notifies the user that the broadcast time is approaching in response to the detection unit detecting that the broadcast start time of the reserved broadcast program is approaching if the receiving apparatus is not power-on state, wherein the control unit, if it is discriminated that the receiving apparatus is not power-on state, powers on the receiving unit and controls the receiving unit and the output unit to receive a broadcast program designated by the reservation information and to output video data of the received broadcast program in response to the communication unit receiving a request for viewing of the reserved broadcast program from the remote control unit during a period from the sending of the information indicating that the broadcast start time is approaching to the broadcast start time, and wherein the control unit controls the receiving unit and the recording unit to automatically receive the broadcast program designated by the reservation information and to record video data of the received broadcast program, and controls the output unit not to output the video data of the received broadcast program if the communication unit does not receive the request for viewing of the reserved broadcast program from the remote control unit during the period from the sending of the information indicating that the broadcast start time is approaching to the broadcast start time.

5. The receiving apparatus according to claim 4, wherein the detection unit detects that current time is a predetermined period of time before the broadcast start time of the broadcast program designated by the reservation information.

6. A receiving apparatus comprising:
a receiving unit configured to receive a television broadcast;
an output unit configured to output video data of the broadcast program of the television broadcast received by the receiving unit to a monitor apparatus;
a communication unit configured to communicate with a remote control unit for allowing a user to operate the receiving apparatus by a wireless communication;
a control unit configured to control the communication unit to send an information indicating that a broadcast start time of a predetermined broadcast program is approaching to the remote control unit such that the remote control unit notifies the user that the broadcast time is approaching in response to the broadcast start time of the predetermined broadcast program approaching if the receiving apparatus is not power-on state, wherein the control unit powers on the receiving unit and controls the receiving unit and the output unit to receive the predetermined broadcast program and to output video data of the predetermined broadcast program in response to the communication unit receiving a request for viewing of the predetermined broadcast program from the remote control unit after the information indicating that the broadcast start time is approaching is sent to the remote control unit by the communication unit, and wherein the control unit notifies that the broadcast start time of the predetermined broadcast program is approaching by the monitor apparatus without sending the information indicating that the broadcast start time of the predetermined broadcast program is approaching to the remote control unit by the communication unit in response to the broadcast start time of the predetermined broadcast program approaching if the receiving apparatus is power-on state.

* * * * *